(12) United States Patent
Okamoto et al.

(10) Patent No.: US 8,094,196 B2
(45) Date of Patent: Jan. 10, 2012

(54) VIDEO MATCHING DEVICE, METHOD, AND PROGRAM

(75) Inventors: Jun Okamoto, Tokyo (JP); Takaaki Kurita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1035 days.

(21) Appl. No.: 11/921,209

(22) PCT Filed: Jul. 11, 2006

(86) PCT No.: PCT/JP2006/313765
§ 371 (c)(1),
(2), (4) Date: Nov. 27, 2007

(87) PCT Pub. No.: WO2007/007750
PCT Pub. Date: Jan. 18, 2007

(65) Prior Publication Data
US 2009/0040311 A1    Feb. 12, 2009

(30) Foreign Application Priority Data

Jul. 11, 2005    (JP) .................................. 2005-201910

(51) Int. Cl.
| H04N 17/00 | (2006.01) |
| H04N 17/02 | (2006.01) |
| G06F 7/02 | (2006.01) |
| H03M 13/00 | (2006.01) |
| G01R 13/00 | (2006.01) |
| G01R 29/26 | (2006.01) |
| G01N 37/00 | (2006.01) |

(52) U.S. Cl. ........ 348/189; 348/177; 348/180; 348/191; 348/182; 714/819; 702/69; 702/71; 702/81

(58) Field of Classification Search .............. 348/177, 348/180, 191, 192; 714/819; 702/69, 71, 702/81
See application file for complete search history.

(56) References Cited

U.S. PATENT DOCUMENTS
5,446,492 A    8/1995    Wolf et al.
(Continued)

FOREIGN PATENT DOCUMENTS
JP    2000-078618 A    3/2000
(Continued)

OTHER PUBLICATIONS
ITU-T Recommendation p. 910.
(Continued)

*Primary Examiner* — Dominic D Saltarelli
(74) *Attorney, Agent, or Firm* — Blakely, Sokoloff, Taylor & Zafman

(57) ABSTRACT

A matched state detection unit (33) of a video matching device (100) detects a reference video frame, of the respective video frames of a reference video (1) and degraded video (2B), which is in a matched state in which it is spatially and temporally matched with each degraded video frame. A matching degree derivation unit (34) controls a degradation amount derivation unit (40) to acquire the first degradation amount indicating the degradation amount between a reference video frame and a degraded video frame in the matched state and the second degradation amount indicating the degradation amount between a reference video frame and a degraded video frame in a state shifted from the matched state by a predetermined number of pixels and calculate a matching degree on the basis of the ratio between the first degradation amount and the second degradation amount. A matching information output unit (35) outputs the matching degree between the reference video and the degraded video after matching.

10 Claims, 9 Drawing Sheets

U.S. PATENT DOCUMENTS 6,704,451 B1    3/2004   Hekstra et al.
7,133,066 B2 *  11/2006  Bourret .................. 348/180

FOREIGN PATENT DOCUMENTS

| | | |
|---|---|---|
| JP | 2001-326869 A | 11/2001 |
| JP | 2003-047029 A | 2/2003 |
| JP | 2004-080177 A | 3/2004 |
| JP | 2005-064679 A | 3/2005 |
| WO | WO 2005/020592 A | 3/2005 |

OTHER PUBLICATIONS

Recommendation ITU-R BT.601 "Studio Encoding Parameters of Digital Television for Standard 4:3 and Wide-Screen 16:9 Aspect Ratios".

"Image Resolution Conversion" in "Easy-to Understand Digital Image Processing", CQ Publishing Co., Ltd.

* cited by examiner

TEST VIDEO FOR FORMAT CONVERSION CHECK

TEST VIDEO FOR POSITION MATCHING/MATCHING RANGE CHECK

TEST VIDEO FOR LOCAL DEFORMATION/PROCESSING POSSIBLE RANGE CHECK

TEST VIDEO FOR LUMINANCE/COLOR OCCURRENCE DISTRIBUTION CHECK

FOUR COLORS: GRAY, RED, GREEN, AND BLUE

VIDEO MATCHING DEVICE, METHOD, AND PROGRAM

The present patent application is a non-provisional application of International Application No. PCT/JP2006/313765, filed Jul. 11, 2006.

TECHNICAL FIELD

The present invention relates to a video processing technique and, more particularly, to a video matching technique of temporally and spatially matching a reference video and a degraded video which are used for subjective quality assessment of videos.

BACKGROUND ART

An objective quality assessment method of estimating subjective quality by using the physical feature amount of a video signal comprising a plurality of video frames (still images) arranged along the time axis includes a technique of estimating a subjective quality assessment value for a desired assessment target by using a reference video and a degraded video. A degraded video is a video degraded by signal processing such as encoding or network transmission with respect to a reference video, i.e., a loss in an assessment target.

In such a technique, if there is a shift in the temporal direction or spatial direction between a reference video and a degraded video, it is impossible to accurately estimate a subjective quality assessment value. It is therefore important to properly match the reference video with the degraded video.

Conventionally proposed techniques of estimating a subjective quality assessment value by using a reference video and a degraded video (see, for example, Japanese Patent Laid-Open No. 2004-080177, U.S. Pat. No. 5,446,492, and U.S. Pat. No. 6,704,451) are intended to be used for TV broadcasting, and can properly estimate subjective quality assessment values concerning accurately synchronized signals or signals at the same video size/frame rate. Therefore, these techniques are based on the assumption that a reference video and a degraded video which are matched in advance are to be used or a reference video and a degraded video which are simply matched at the start time of a video are to be used.

In video distribution services and video communication services using IP networks such as the Internet, which have recently become popular, since personal computer (PC) terminals receive videos, a reference video and a degraded video may have different sizes or different aspect ratios or a deterioration in video quality due to network performance is large. For this reason, the spatial or temporal positions of the reference video and degraded video do not match. Therefore, it is impossible to properly estimate a subjective quality assessment value by the above technique.

In order to solve this problem, the present inventors have proposed a technique of matching a reference video and a degraded video in the temporal or spatial direction and obtaining an objective assessment result by matching the signal formats of a reference video and degraded video and performing macroscopic and microscopic matching processing for these video signals for each frame (see, for example, WO2005/020592A1).

DISCLOSURE OF INVENTION

Problem to be Solved by the Invention

This conventional technique can properly perform matching when a reference video and a degraded video are enlarged/reduced/deformed by, for example, an integer multiple of the number of pixels. However, the technique cannot perfectly cope with a case wherein the videos are simply enlarged/reduced/deformed by several pixels.

Depending on video encoding or signal processing in a transmission system or the like as an assessment target, in particular, a video itself may be enlarged/reduced/deformed by several pixels, a reference video itself is initially blurred, or the degree of degradation is large. Such video signals can be partially matched, but many other regions cannot be matched. This may make it impossible to optimize the matching between the reference video and the degraded video.

For this reason, a person in charge of assessment who has an expert knowledge needs to empirically determine whether video matching is proper, when an objective quality assessment value is to be obtained. If, therefore, there is no person in charge of assessment who has an expert knowledge, it is impossible to determine whether video matching is proper, when objective quality assessment is to be performed. As a consequence, it is impossible to estimate a proper subjective quality assessment value.

The present invention has been made to solve this problem, and has as its object to provide a video matching device, method, and program which can determine whether video matching is proper, when objective quality assessment is to be performed, without letting any person in charge of assessment who has an expert knowledge empirically perform determination.

Means of Solution to the Problem

In order to achieve this object, a video matching device according to the present invention comprises matched state detection means for receiving an arbitrary reference video having a plurality of reference video frames arranged along a time axis and a degraded video having degraded video frames obtained when the reference video frames are degraded by an arbitrary assessment target, and detecting, for each degraded video frame, a reference video frame, of a plurality of reference video frames having temporal shifts within a predetermined number of frames from the degraded video frame, which is in a matched state in which the reference video frame is spatially and temporally matched with the degraded video frame, matching degree derivation means for deriving a matching degree indicating a degree of matching between a reference video frame and a degraded video frame in the matched state, matching information output means for outputting a reference video, a degraded video, and the matching degree on the basis of the matched state, and a degradation amount derivation unit which derives a degradation amount indicating a degradation degree between two arbitrary video frames, wherein the matching degree derivation means controls the degradation amount derivation unit to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels and calculate the matching degree on the basis of a ratio between the first degradation amount and the second degradation amount.

A video matching method according to the present invention comprises the matched state detection step of causing matched state detection means to receive an arbitrary reference video having a plurality of reference video frames arranged along a time axis and a degraded video having degraded video frames obtained when the reference video frames are degraded by an arbitrary assessment target, and detect, for each degraded video frame, a reference video frame, of a plurality of reference video frames having temporal shifts within a predetermined number of frames from the degraded video frame, which is in a matched state in which the reference video frame is spatially and temporally matched with the degraded video frame, the matching degree derivation step of causing matched degree derivation means to derive a matching degree indicating a degree of matching between a reference video frame and a degraded video frame in the matched state, the matching information output step of causing matching information output means to output a reference video, a degraded video, and the matching degree on the basis of the matched state, and the degradation amount derivation step of causing a degradation amount derivation unit to derive a degradation amount indicating a degradation degree between two arbitrary video frames, wherein the matching degree derivation step comprises the steps of using the degradation amount derivation step to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels, and calculating the matching degree on the basis of a ratio between the first degradation amount and the second degradation amount.

A program according to the present invention causes a computer of a video matching device which receives an arbitrary reference video having a plurality of reference video frames arranged along a time axis and a degraded video having degraded video frames obtained when the reference video frames are degraded by an assessment target, and outputs the reference video and the degraded video upon spatially and temporally matching the reference video and the degraded video to execute the matched state detection step of causing matched state detection means to receive an arbitrary reference video having a plurality of reference video frames arranged along a time axis and a degraded video having degraded video frames obtained when the reference video frames are degraded by an arbitrary assessment target, and detect, for each degraded video frame, a reference video frame, of a plurality of reference video frames having temporal shifts within a predetermined number of frames from the degraded video frame, which is in a matched state in which the reference video frame is spatially and temporally matched with the degraded video frame, the matching degree derivation step of causing matched degree derivation means to derive a matching degree indicating a degree of matching between a reference video frame and a degraded video frame in the matched state, the matching information output step of causing matching information output means to output a reference video, a degraded video, and the matching degree on the basis of the matched state, and the degradation amount derivation step of causing a degradation amount derivation unit to derive a degradation amount indicating a degradation degree between two arbitrary video frames, wherein the computer is caused to execute, as the matching degree derivation step, the steps of using the degradation amount derivation step to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels, and calculating the matching degree on the basis of a ratio between the first degradation amount and the second degradation amount.

Effects of the Invention

According to the present invention, a matching degree indicating the degree of matching is calculated on the basis of the ratio between the first degradation amount indicating the degradation amount between a reference video frame and a degraded video frame in the matched state in which a reference video and a degraded video are spatially and temporally matched most closely and the second degradation amount indicating the degradation amount between a reference video frame and a degraded video frame in a state shifted from the matched state by a predetermined number of pixels. This makes it possible to calculate a matching degree as an index indicating the degree of optimization of video matching.

It is therefore possible to determine whether video matching is proper when obtaining an objective quality assessment value, without letting any person in charge of assessment who has an expert knowledge empirically perform determination, thereby easily estimating a proper subjective quality assessment value. This eventually makes it possible to implement development and service provision in consideration of quality in video services.

BEST MODE FOR CARRYING OUT THE INVENTION

An embodiment of the present invention will be described next with reference to the accompanying drawings.

[Video Matching Device]

Figure 1:
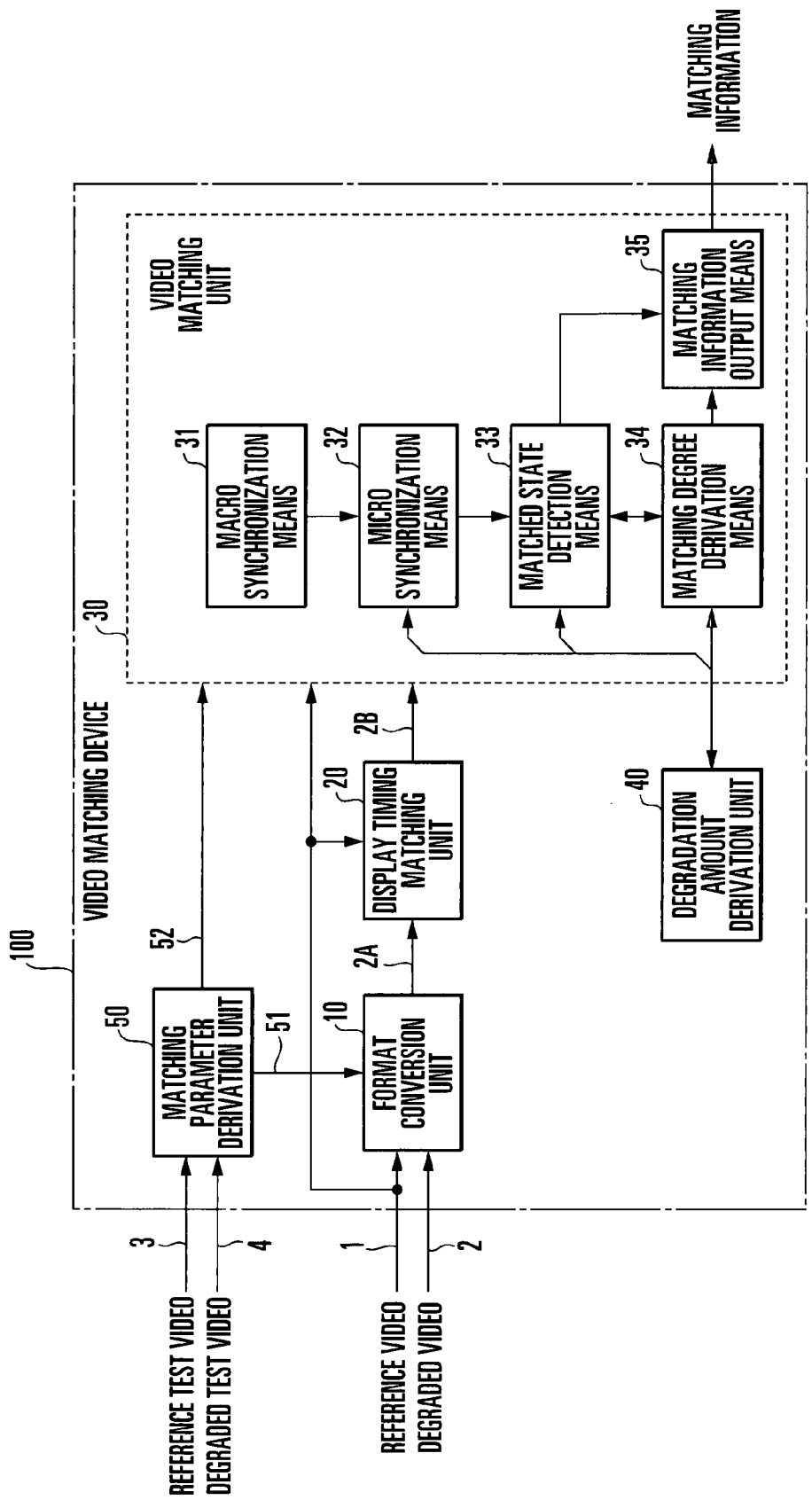
FIG. 1 is a block diagram showing the arrangement of a video matching device according to an embodiment of the present invention.

A video matching device according to an embodiment of the present invention will be described first with reference to FIG. 1. FIG. 1 is a block diagram showing the arrangement of the video matching device according to the embodiment of the present invention.

A video matching device 100 comprises a signal processing device which obtains a desired output signal by performing arbitrary computation processing for an input signal. This device receives an arbitrary reference video 1 having a plurality of video frames (still images) arranged along the time axis and a degraded video 2 obtained when the reference video 1 is degraded by an arbitrary assessment target such as encoding signal processing or network transmission, and outputs a video obtained by spatially and temporally matching the degraded video 2 with the reference video 1 and various kinds of matching processing information associated with matching processing.

This embodiment is configured to calculate/output a matching degree indicating the degree of matching on the basis of the ratio between the first degradation amount indicating the degradation amount between a reference video frame and a degraded video frame in the matched state in which a reference video and a degraded video are spatially and temporally matched most closely and the second degradation amount indicating the degradation amount between a reference video frame and a degraded video frame in a state shifted from the matched state by a predetermined number of pixels.

The video matching device 100 includes a format conversion unit 10, display timing matching unit 20, video matching unit 30, degradation amount derivation unit 40, and matching parameter derivation unit 50.

These functional units are implemented by a signal processing circuit unit, computation processing unit, and storage unit. Of these components, the computation processing unit includes a microprocessor such as a CPU or a DSP and its peripheral circuit, and implements various kinds of functional units by loading programs from a memory or storage unit in the microprocessor or the peripheral circuit and executing the programs. The storage unit comprises a storage device such as a hard disk or a memory, and stores various kinds of processing information used by the signal processing circuit unit and the computation processing unit, the video data of a reference video and degraded video, and programs.

The format conversion unit 10 comprises a signal processing circuit and a computation processing unit, and has a function of converting the signal format of the degraded video 2 into the signal format of the reference video 1, and a function of outputting a degraded video 2A after format conversion which is obtained by format conversion.

The display timing matching unit 20 comprises a signal processing circuit and a computation processing unit, and has a function of matching the number of video frames and display timing of the degraded video 2A after format conversion with the reference video 1, and a function of outputting a degraded video 2B after timing matching which is obtained by this matching.

The video matching unit 30 comprises a signal processing circuit and a computation processing unit, and has a function of performing matching processing for the input reference video 1 and the degraded video 2B for each video frame and outputting a reference video and a degraded video after matching and various kinds of matching information associated with vide matching processing such as the matching degree of the videos.

The video matching unit 30 includes a macro synchronization means 31, micro synchronization means 32, matched state detection means 33, matching degree derivation means 34, and matching information output means 35 as concrete functional means.

The macro synchronization means 31 has a function of deriving the macro frame difference between the reference video 1 and the degraded video 2B by comparing the transitions of predetermined video feature amounts respectively extracted from the input reference video 1 and the degraded video 2B.

The micro synchronization means 32 has a function of selecting frame pairs having an arbitrary degraded video frame and a plurality of reference video frames having temporal shifts within a predetermined number of frames relative to the degraded video frame from the reference video 1 and the degraded video 2B which are macro-synchronized by the macro synchronization means 31, and acquiring the degradation amounts of these frame pairs by controlling the degradation amount derivation unit 40, and a function of deriving the micro frame difference between the reference video 1 and the degraded video 2B on the basis of one of the frame pairs which exhibits the minimum degradation amount.

The matched state detection means 33 has a function of detecting a reference video frame in the matched state in which it is spatially and temporally matched with each degraded video frame from a plurality of reference video frames having temporal shifts within a predetermined number of frames relative to the degraded video frame with respect to the reference video 1 and the degraded video 2B which are synchronized on the basis of the macro frame difference and the micro frame difference.

The matching degree derivation means 34 has a function of deriving a matching degree indicating the degree of matching between a reference video frame and a degraded video frame which are in the matched state. More specifically, the matching degree derivation means 34 controls the degradation amount derivation unit 40 to acquire the first degradation amount indicating the degradation amount between a reference video frame and a degraded video which are in the matched state and the second degradation amount indicating the degradation amount between a reference video frame and a degraded video frame which are in a state shifted from the matched state by a predetermined number of pixels, and calculates a matching degree on the basis of the ratio between the first degradation amount and the second degradation amount. In this case, it suffices to calculate a matching degree by multiplying the above ratio by the spatial feature amount (SI) of the reference video calculated on the basis of the prescriptions of ITU-T P.910.

The matching information output means 35 has a function of outputting matching information associated with these video matching processes, which includes a matching degree for each degraded video frame.

The degradation amount derivation unit 40 comprises a signal processing circuit and a computation processing unit, and has a function of deriving the signal-to-noise ratio between two arbitrary video frames as a degradation amount, a function of deriving the average value of the respective pixel value differences between two arbitrary video frames as an inter-frame difference value, and a function of outputting the degradation amount and the inter-frame difference value to the video matching unit 30.

More specifically, the degradation amount derivation unit 40 calculates the signal-to-noise ratio between a reference video frame and a degraded video frame as the first degradation amount in accordance with an instruction from the matching degree derivation means 34. The degradation amount derivation unit 40 also calculates, as the second degradation amount, the average signal-to-noise ratio between a reference video frame in the matched state and a plurality of degraded video frames in a state shifted from the matched state by predetermined numbers of pixels in the horizontal direction, the vertical direction, and both the vertical and horizontal directions in accordance with an instruction from the matching degree derivation means 34. In addition, the degradation amount derivation unit 40 calculates the signal-to-noise ratio between a reference video frame and a degraded video frame as a degradation amount in accordance with an instruction from the matched state detection means 33.

The matching parameter derivation unit 50 comprises a signal processing circuit and a computation processing unit, and has a function of comparing a predetermined reference test video 3 and a degraded test video 4 obtained when the reference test video 3 is degraded by an assessment target, and a function of deriving various kinds of matching parameters used for video matching processing.

[Operation of Video Matching Device]

Figure 2:
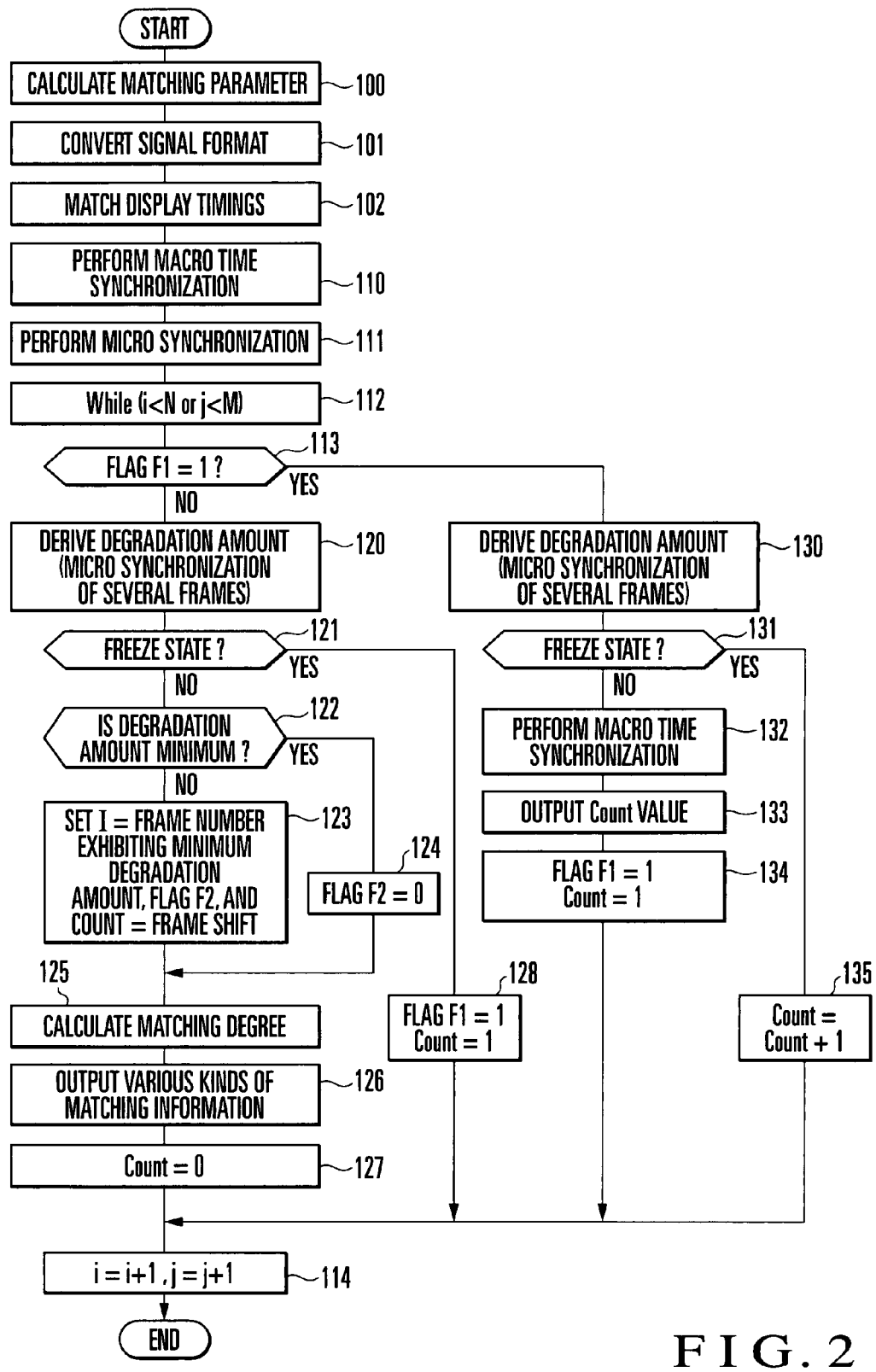
FIG. 2 is a flowchart showing video matching processing in the video matching device according to this embodiment.

The operation of the video matching device according to this embodiment will be described next with reference to FIG. 2. FIG. 2 is a flowchart showing video matching processing in the video matching device according to the embodiment. Assume that in this case, the reference video 1 and the degraded video 2 contain frame rate information or frame display time/capture time information, and a reference video and a degraded video are to be processed in non-real time while a plurality of frames of the videos which are located before and after a frame as a processing target are stored in the storage unit.

Before matching the reference video 1 with the degraded video 2, the video matching device 100 causes the matching parameter derivation unit 50 to compare the reference test video 3 with the degraded test video 4 and derive various kinds of matching parameters (step 100).

In this case, it suffices to input the reference test video 3 stored in the video matching device 100 in advance to an assessment target and receive the degraded test video 4 as an output. The reference test video 3 and the degraded test video 4 may be actual signals or data files comprising data sequences representing signal values.

If, however, it is possible to recognize from the header information of each input data file that the signal format or size of the degraded test video 4 differs from that of the reference test video 3, matching parameters are to be derived after the degraded test video 4 is converted into the same format as that of the reference test video 3 by using the same processing method as that in the format conversion unit 10.

When deriving matching parameters in step 100, the matching parameter derivation unit 50 derives various kinds of matching parameters by using reference test videos like those shown in FIGS. 3 to 6.

Figure 3:
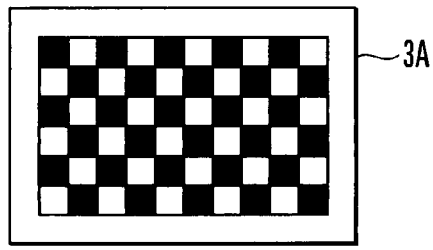
FIG. 3 is a view for explaining a reference test video example for format conversion check.

FIG. 3 shows a reference test video example for format conversion check. A reference test video 3A is a test video obtained by making patterns with the same shape, e.g., a checkered pattern, have maximum and minimum luminances (including colors).

Using the reference test video 3A makes it possible to derive a video enlargement/reduction ratio 5A of the reference test video 3 and degraded test video 4 as a matching parameter on the basis of the positional relationship between the patterns or the size difference. In addition, using the reference test video 3A makes it possible to derive a luminance occurrence range 5B in the reference test video 3 and the degraded test video 4 as a matching parameter on the basis of the maximum and minimum luminance values (including colors) of the reference video and degraded video.

Figure 4:
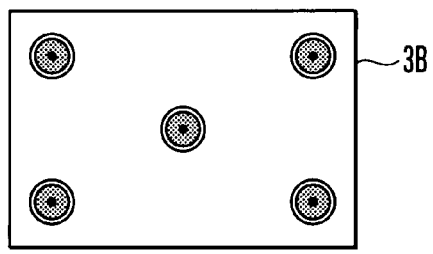
FIG. 4 is a view for explaining a reference test video example for position matching/matching range check.

FIG. 4 shows a reference test video example for position matching/matching range check. A reference test video 3B is a test video having markers indicating a plurality of points scattered in a wide range in the video. Even if a specific point is degraded and difficult to be discriminated, this video allows to estimate the point from the surrounding pattern.

Using the reference test video 3B makes it possible to derive, as matching parameters, a shift amount 5C in the spatial direction in the reference video and the degraded video and a corresponding range 5D in which shifts in the spatial direction correspond to each other within video frames.

Figure 5:
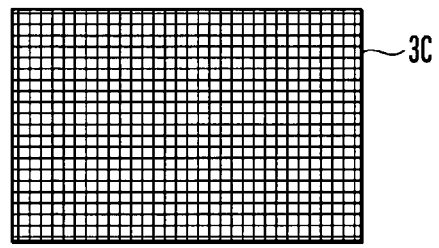
FIG. 5 is a view for explaining a reference test video example for local deformation processing possible range check.

FIG. 5 shows a reference test video example for local deformation processing possible range check. A reference test video 3C is a test image obtained by alternately inserting black and white frames for each predetermined number of pixels, e.g., for each pixel.

Using the reference test video 3C makes it possible to derive, as matching parameters, a video deformation region range 5E of part of the degraded test video with respect to the reference test video 3C and an effective region range 5F which can be effectively used as an assessment video.

Figure 6:
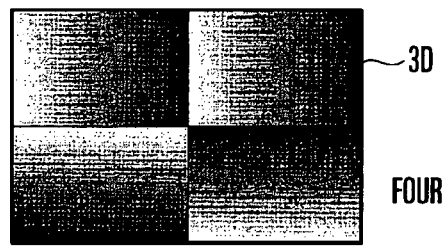
FIG. 6 is a view for explaining a reference test video example for luminance/color occurrence distribution check.

FIG. 6 shows a reference test video example for luminance/color occurrence distribution check. A reference test video 3D is a test image comprising an image (gray image) in which the luminance in the frame is repeatedly changed stepwise from a minimum value (e.g., 0) to a maximum value (e.g., 255) and images (red, green, and blue images) in which the respective reference colors are changed in the same manner.

Using the reference test video 3D makes it possible to derive a luminance or color occurrence distribution 5G (average values, variances, or the numbers of gray levels) in the degraded test video 4 as a matching parameter.

If the reference video 1 and the degraded video 2 differ in signal format, size, aspect ratio, or signal occurrence range, the format conversion unit 10 converts the signal format of the degraded video 2 on the basis of a matching parameter 51 including the video enlargement/reduction ratio 5A or the luminance occurrence range 5B, and outputs the degraded video 2A after format conversion (step 101).

If the reference video 1 has an uncompressed YUV format and the degraded video has an uncompressed RGB format, the format conversion unit 10 converts the degraded video 2 by using, for example, the conversion formula disclosed in Rec.ITU-R BT.601 "STUDIO ENCODING PARAMETERS OF DIGITAL TELEVISION FOR STANDARD 4:3 AND WIDE-SCREEN 16:9 ASPECT RATIOS".

Note that if the degraded video 2 has a compressed format, the format is converted into an uncompressed format in advance. If the videos differ in size or aspect ratio, they are converted to have the same size or aspect ratio. In some cases, it suffices to perform size conversion by simply calculating a size as an integer multiple, but in other cases, it is necessary to convert the size to an arbitrary size. For example, as disclosed in chapter 7 "Image Resolution Conversion" in "Easy-to-Understand Digital Image Processing", CQ publishing Co., Ltd, the size is converted into an arbitrary size. After this processing, the reference video and the converted degraded video 2A are transferred to the display timing matching unit 20.

If video formats are not accurately comprehended in advance or headers and the like have no information about video formats, in particular, video enlargement/reduction conversion is performed on the basis of the video enlargement/reduction ratio 5A derived by the matching parameter derivation unit 50. Assume also that if it is determined on the basis of the luminance occurrence range 5B that the pixel occurrence range standards differ, conversion is performed to match the occurrence ranges by using linear conversion of luminance values.

Figure 7:
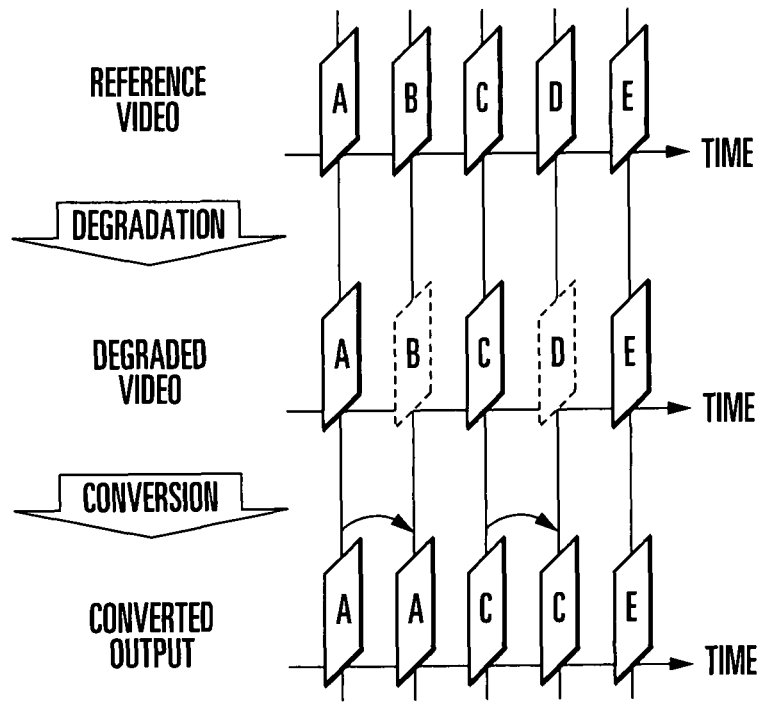
FIG. 7 is a view for explaining a display timing matching example.
Figure 8:
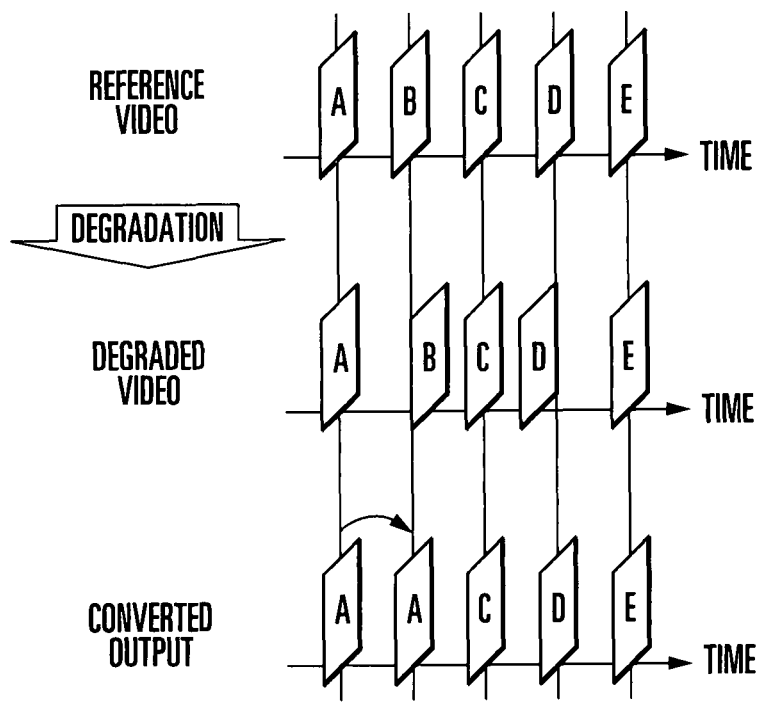
FIG. 8 is a view for explaining another display timing matching example.
Figure 9:
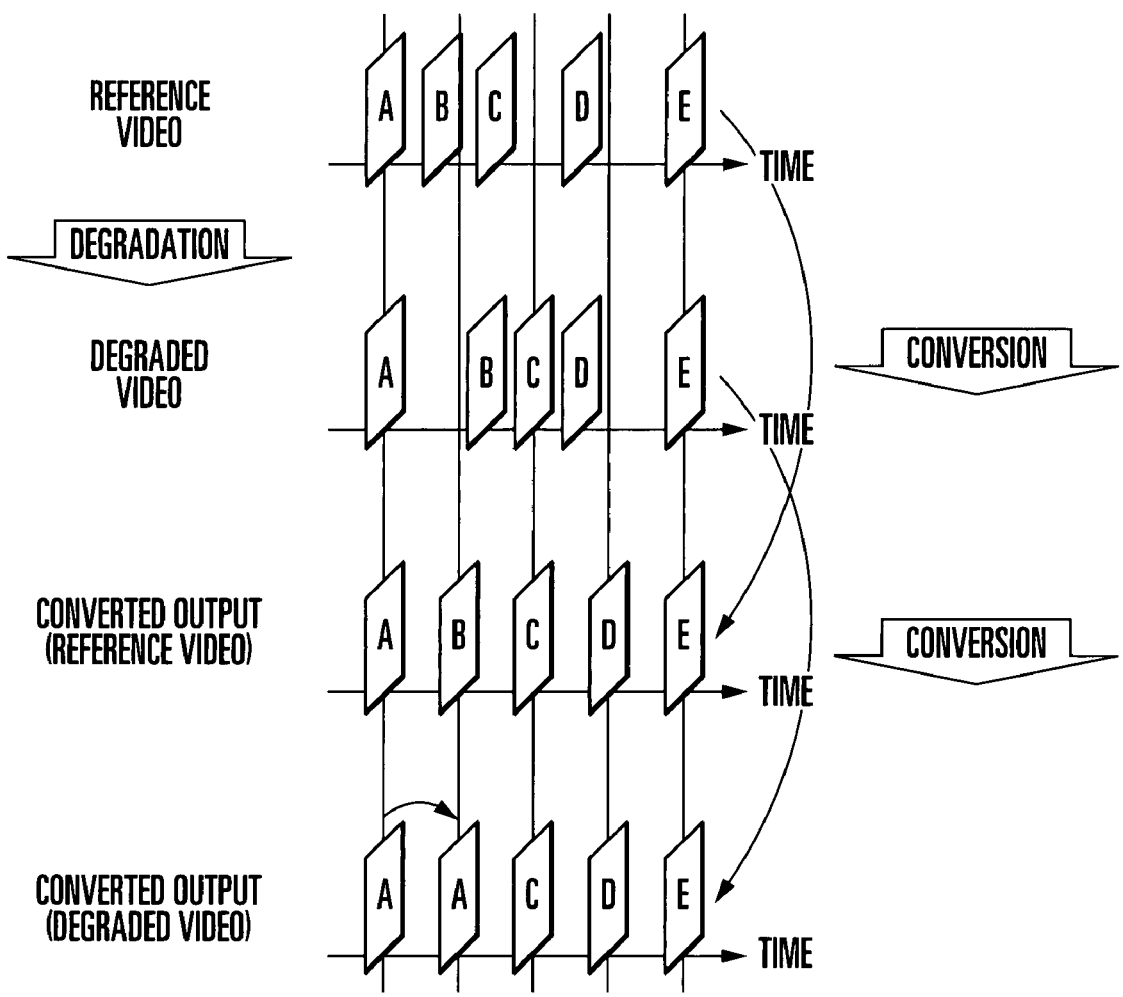
FIG. 9 is a view for explaining still another display timing matching example.

Subsequently, the display timing matching unit 20 performs processing such as a frame interpolation to match the display timing of the degraded video 2A having undergone format conversion with that of the reference video 1, and outputs the degraded video 2B after timing matching (step 102). FIGS. 7 to 9 show examples of display timing matching.

More specifically, as shown in FIG. 7, if the display intervals of the degraded video 2A after format conversion are steadily longer than those of the reference video 1, the degraded video 2A is interpolated by interpolating immediately preceding frames.

If the display intervals of the degraded video fluctuate as shown in FIG. 8, the degraded video 2A is interpolated by using videos displayed at the display timing of the reference video 1 or videos displayed at a display timing temporally close to that of the reference video 1.

If the frame rate of the reference video 1 itself is not constant as shown in FIG. 9, the reference video 1 and the degraded video 2A are interpolated to be displayed at accurate time intervals different from those of them.

The video matching unit 30 performs video matching processing for the reference video 1 and the degraded video 2B after timing matching while transitioning the three operation states, i.e., the assessment start state, the synchronization state, and the freeze state, by using a matching parameter 52 such as the video enlargement/reduction ratio 5A, the luminance occurrence range 5B, the shift amount 5C in the spatial direction, the corresponding range 5D, the video deformation region range 5E, or the occurrence distribution 5G (steps 110 to 135).

First of all, in the assessment start state, the video matching unit 30 causes the macro synchronization means 31 to perform macro synchronization processing to perform rough synchronization in the temporal direction (step 110). In this macro synchronization processing, the macro synchronization means 31 compares the transitions of video feature amounts such as the average values of luminances/color differences/RGB values for each frame or in specific regions concerning the reference video 1 and the degraded video 2B for a predetermined period of time, and derives the frame difference between them when the matching property between them becomes highest, as a macro shift in the temporal direction, i.e., a macro frame difference.

Figure 10:
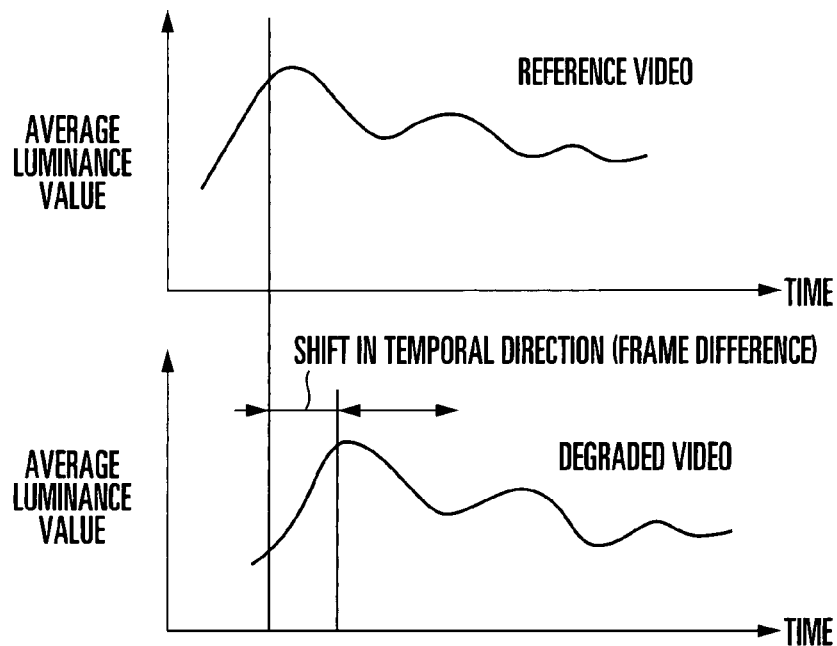
FIG. 10 is a graph for explaining a macro synchronization processing example in the temporal direction.

FIG. 10 shows an example of macro synchronization processing in the temporal direction. More specifically, as shown in FIG. 10, a shift in the temporal direction, i.e., a macro frame difference, is derived from a condition under which the difference between the respective time-series values is minimized by shifting feature amounts such as average luminance values in the temporal direction or a condition under which a cross-correlation coefficient is maximized.

Figure 11:
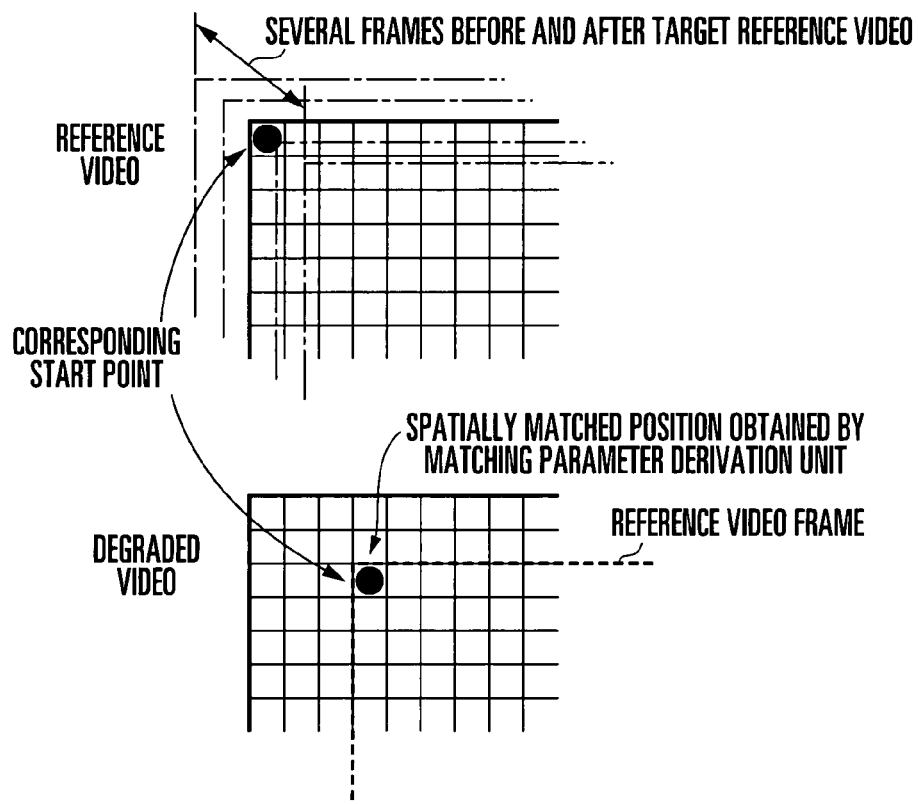
FIG. 11 is a graph for explaining a micro synchronization processing example in the temporal direction.

Subsequently, the video matching unit 30 performs micro synchronization processing to establish more accurate synchronization in the temporal direction and the spatial direction with respect to the reference video 1 and the degraded video 2B after macro synchronization is established on the basis of the macro frame difference obtained by the micro synchronization means 32 (step 111). FIG. 11 is a view for explaining an example of micro synchronization processing.

In this micro synchronization processing, the micro synchronization means 32 instructs the degradation amount derivation unit 40 to calculate a degradation amount with respect to each frame pair, which comprises an arbitrary frame pair of the reference video 1 and the degraded video 2B after macro synchronization, e.g., a pair of the start frame of the degraded video 2B and a corresponding frame of the reference video 1 or a frame having a time shift within a predetermined number of frames from the frame, when the pixel positions between the two frames are corrected by the shift amount 5C in the spatial direction (vertical and horizontal positions) obtained by the matching parameter derivation unit 50, as shown in FIG. 11. In accordance with this operation, the degradation amount derivation unit 40 calculates each signal-to-noise ratio PSNR (Peak Signal to Noise Ratio) as the degradation amount between the two frames by using equation (1).

The micro synchronization means 32 obtains the most closely matched frame correspondence between the reference video 1 and the degraded video 2B by selecting a frame pair which exhibits the maximum signal-to-noise ratio PSNR calculated by the degradation amount derivation unit 40, i.e., the minimum degradation amount, and derives the frame difference as a micro frame difference. This makes it possible to implement frame microscopic matching in the temporal direction. Such a frame correspondence between the reference video 1 and the degraded video 2B will be referred to as a synchronized state hereinafter.

In addition, the spatial positional relationship between a frame pair which is equivalent to such a frame correspondence between the reference video 1 and the degraded video 2 and exhibits the minimum degradation amount, more specifically, a state in which frames are in a positional relationship which exhibits the maximum signal-to-noise ratio PSNR, will be referred to as a matched state in which the reference video 1 and the degraded video 2B are temporally and spatially matched most closely.

The video matching unit 30 sequentially selects reference video target frames and degraded video target frames from the reference video 1 and the degraded video 2B having the frame correspondence equivalent to the synchronized state up to the last video frame of the reference video 1 or the degraded video 2B after timing matching, and starts a processing loop in the following synchronized state and freeze state with respect to the selected reference video target frames and degraded video target frames. (steps 112 and 114).

Referring to FIG. 2, variables i and j respectively represent a reference video target frame number and a degraded video target frame number, and variables N and M respectively represent a reference video end frame number and a degraded video end frame number. In addition, a flag F1 indicates the synchronized state (0) or asynchronized state (1) of two videos in the spatial direction, and a flag F2 represents synchronization (0), frame omission (1), or other (2: frame return) of two videos in the temporal direction. A variable Count represents the number of times that a degraded video is frozen.

In the synchronized state indicated by the flag F1 when it is 0 (step 113: NO), the video matching unit 30 generates a matched degraded video by correcting the degraded video 2B on the basis of the shift amount 5C in the temporal/spatial direction, the luminance information 5B, and the color information 5G obtained by the matching parameter derivation unit 50, and calculates a degradation amount with respect to the reference video and an inter-frame difference value by matched state detection processing (to be described later) (step 120).

In this case, the matched state detection means 33 transfers these processing target frames of the degraded video and reference video to the degradation amount derivation unit 40 to acquire a degradation amount and an inter-frame difference value associated with these frames from the degradation amount derivation unit 40.

Figure 12:
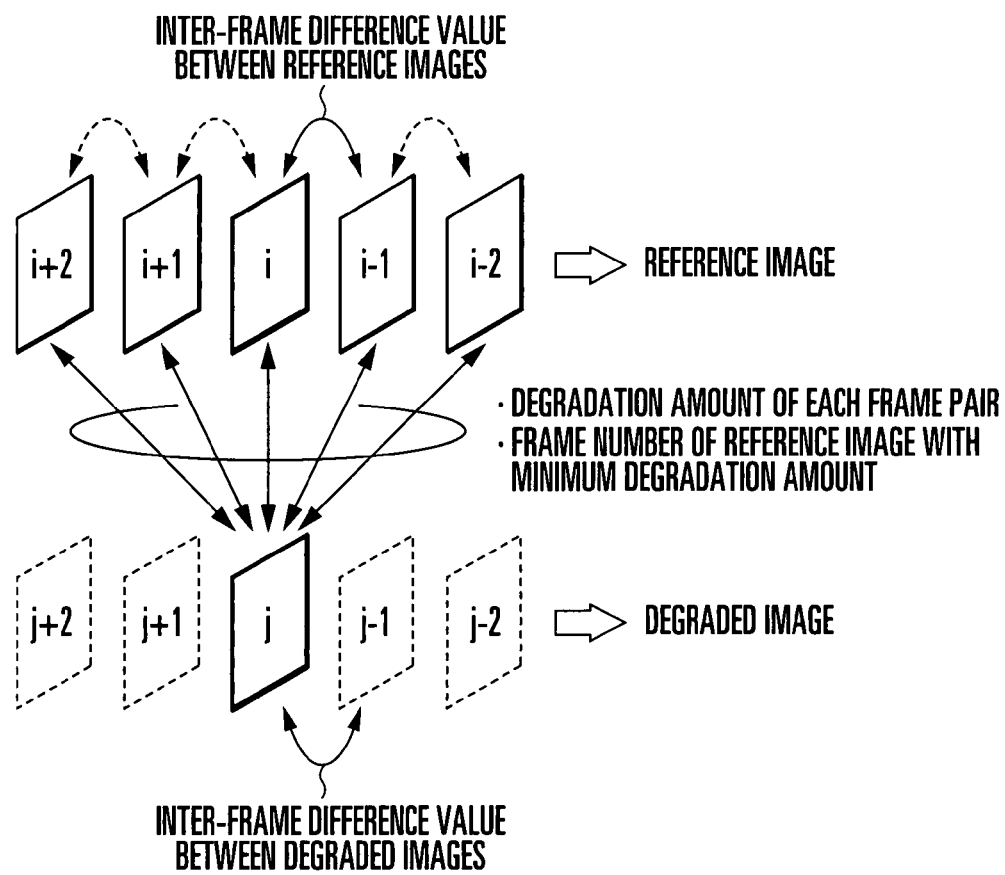
FIG. 12 is a view for explaining an example of how a degradation amount and an inter-frame difference value are calculated in matched state detection processing.

FIG. 12 is a view for explaining an example of how a degradation amount and an inter-frame difference value are calculated in matched state detection processing. As shown in FIG. 12, the degradation amount derivation unit 40 derives a degradation amount with respect to each frame pair having search target frames including a degraded video target frame (j) of the degraded video 2B, a corresponding reference video target frame (i) of the reference video 1, and a reference video frame having a time shift within a predetermined number of frames from the reference video target frame (i) which are received from the matched state detection means 33. The degradation amount derivation unit 40 then selects one of these frame pairs which exhibits a minimum degradation amount, and derives the frame number of the reference video frame.

With respect to the reference video frame and the degraded video frame of the above frame pair, the degradation amount derivation unit 40 also derives the inter-frame difference value between frames immediately preceding the frame pair by using equation (2). In this case, the degradation amount derivation unit 40 calculates the difference values between the pixels of the two video frames for each pixel, and calculates the average difference value of all the pixels of the video frames as an inter-frame difference value.

The video matching unit 30 causes the matched state detection means 33 to determine, on the basis of the inter-frame difference value of each target frame derived from the degradation amount derivation unit 40, whether a degraded video is frozen (step 121). That is, if the difference value concerning the reference video indicates some value but the difference value concerning the degraded video indicates almost 0, a freeze state is determined, in which the degraded video has not changed.

If the degraded video is in the freeze state (step 121: YES), the video matching unit 30 sets the flag F1 in the asynchronized state (1), and sets the freeze count Count to 1 (step 128). The process then shifts to step 114 of the processing loop.

If the degraded video is not in the freeze state (step 121: NO), the matched state detection means 33 determines whether the degradation amount between the degraded video target frame and the reference video frame, which is obtained by matched state detection processing in step 120, is minimum (step 122). If the degradation amount is minimum (step 122: YES), the synchronized state (F2=0) is set (step 124).

If the degradation amount is not minimum (step 122: NO), the matched state detection means 33 determines that the current state is a frame shift state (a frame omission stat, a frame return state, or the like), and sets the number of a reference video frame, of the search target frames, which exhibits a minimum degradation amount and is set in the matched state, to i. If a frame omission state is determined, flag F2=1 is set. Otherwise, flag F2=2 is set. In this case, a frame shift count is set to Count (step 123).

Subsequently, the video matching unit 30 causes the matching degree derivation means 34 to execute matching degree calculation processing (to be described above) to calculate a matching degree indicating the degree of matching between the reference video frame and the degraded video frame in the matched state (step 125). The matching information output means 35 then outputs a matched reference video having the reference video and the degraded video which are matched on the basis of the above matched state and matching information such a matched degraded video, a matching degree, matching parameters (5A to 5G), synchronization information (F2), and a freeze count (Count) (step 126). After Count is reset to 0 (step 127), the process shifts to step 114.

In the asynchronized state in which the flag F1 indicates 1 (step 113: YES), the video matching unit 30 causes the matched state detection means 33 to execute matched state detection processing in the same manner as in step 120 (step 130), and determines as in step 121 whether the degraded video is in the freeze state (step 131).

If the degraded video is in the freeze state (step 131: YES), the matched state detection means 33 increments (+1) the freeze count Count (step 135). The process then shifts to step 114 of the processing loop.

If the degraded video is not in the freeze state (step 131: NO), the video matching unit 30 performs the same macro synchronization processing as in step 110 (step 132). The matching information output means 35 then outputs the freeze count Count (step 133). The flag F1 and Count are set to 0 (step 134). The process then shifts to step 114 of the processing loop.

In step 114, the reference video target frame number i and the degraded video target frame number j are incremented. If i<N or j<M holds, the loop processing between steps 112 and 114 is repeated. When both i and j reach N and M, the series of the video matching processing is terminated.

Note that in the above video matching processing, feature amounts such as the average values of luminances/color differences/RGB values of signals from one entire frame or a specific region are always stored with respect to a reference video and a degraded video. If synchronization cannot be established for some reason, e.g., a feature amount in a target frame differs from an average value in a predetermined period of time by a threshold (a constant multiple of a standard deviation like 3s) or more, an assessment initial state starts, and the processing from step 110 is resumed.

[Matching Degree Calculating Operation]

Figure 13:
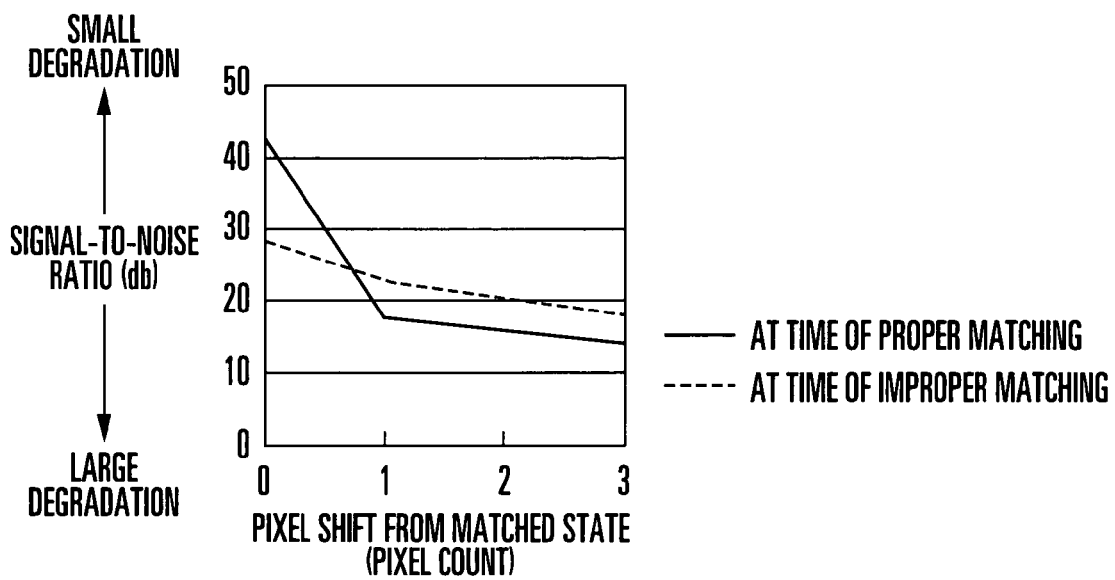
FIG. 13 is a graph for explaining changes in matching characteristic depending on matched states.
Figure 14:
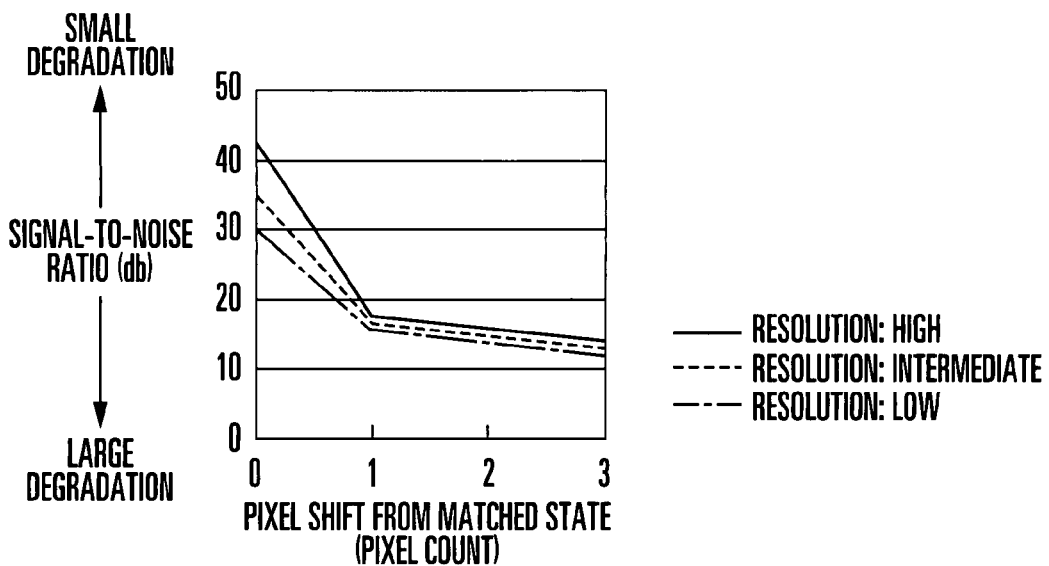
FIG. 14 is a graph for explaining changes in matching characteristic depending on the resolution of a reference video.
Figure 15:
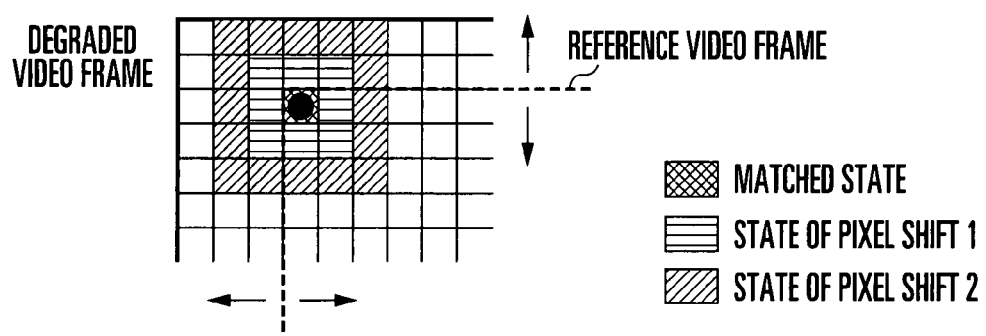
FIG. 15 is a view for explaining a pixel shift.

Matching degree calculating operation according to this embodiment will be described next with reference to FIGS. 13 to 15. FIG. 13 is a graph for explaining changes in matching characteristic depending on the matched states. FIG. 14 is a graph showing changes in matching characteristic depending on resolution of a reference video. FIG. 15 is a view for explaining a pixel shift.

A matching degree is derived by using the following two characteristics. The first characteristic is that as shown in FIG. 13, when matching is optimized, the difference between the signal-to-noise ratio between frames of a reference video and a degraded video in the matched state and the signal-to-noise ratio in a state shifted from the matched state even by one pixel is large, whereas when matching is not optimized, the difference from the signal-to-noise ratio in a state shifted from the matched state even by one pixel is small. The second characteristic is that when matching is optimized, the graphic pattern of the reference video is fine as shown in FIG. 14, and this tendency becomes more conspicuous as a video has higher resolution.

Concrete matching degree calculation processing by the matching degree derivation means 34 will be described. First of all, the matching degree derivation means 34 calculates the pixel difference value between a reference video and a degraded video with respect to a peak luminance (255) as indicated by the signal-to-noise ratio PSNR (Peak Signal to Noise Ratio) given by equation (1), i.e., a logarithmic ratio with respect to MSE given by equation (2), as a degradation amount (first degradation amount) in the matched state in which the reference video and the degraded video are temporally and spatially matched most closely.

In equation (2), Yin and Yout represent a reference video and a degraded video, respectively, N represents the number of pixels, and Y(x, y, i) represents the pixel value at a position (x, y) in an ith frame.

$$PSNR = 10\log_{10}\left(\frac{255^2}{MSE}\right) \quad (1)$$

$$MSE = \frac{1}{N}\sum_{x,y}\{Y_{out}(x, y, i) - Y_{in}(x, y, i)\}^2 \quad (2)$$

The signal-to-noise ratios PSNR of videos in states (nearly matched states) shifted from the matched state by a predetermined number of pixels are calculated, and the average value of the signal-to-noise ratios is derived as a degradation amount (second degradation amount). In this case, as shown in FIG. 15, eight states shifted from the matched state by one pixel or 18 states shifted from the matched state by two pixels are to be used.

As the spatial feature amount of a reference video, an SI value (Spatial Information) as the spatial feature amount defined in ITU-T P.910 ("Subjective video quality assessment methods for multimedia applications", August 1996.) is calculated, and a matching degree is derived by using these values according to equation (3). In this equation, a is a coefficient for normalizing a matching degree.

matching degree = (3)

$a \times SI$ value of reference video $\times$ (PSNR in matched state/average of PSNR in nearly matched states)

As described, this embodiment calculates and outputs a matching degree indicating the degree of matching on the basis of the ratio between the first degradation amount indicating the degradation amount between a reference video frame and a degraded video frame when a reference video and a degraded video are in the matched state in which they are spatially and temporally matched most closely and the second degradation amount indicating the degradation amount between a reference video frame and a degraded video frame in a state shifted from the matched state by a predetermined number of pixels. This makes it possible to calculate a matching degree as an index indicating the degree of optimization of video matching.

It is therefore possible to determine whether video matching is proper when obtaining an objective quality assessment, without letting any person in charge of assessment who has an expert knowledge empirically perform determination. This eventually makes it possible to implement development and service provision in consideration of quality in video services.

In addition, since a matching degree is calculated by multiplying a degradation amount ratio by the spatial feature amount (SI) of a reference video calculated on the basis of the prescriptions of ITU-T P.910, weighting can be done by the feature amount of the reference video.

Furthermore, since the signal-to-noise ratio between a reference video and degraded video which is calculated from pixels as degradation amount calculation targets is used as a degradation amount, a matching degree can be stably calculated in a versatile manner. Although this embodiment has exemplified the case wherein the signal-to-noise PSNR is used as a degradation amount, the present invention is not limited to this, and the average difference values of pixel values may be used. When a signal-to-noise ratio is to be used, a known signal-to-noise ratio value other than a PSNR may be used.

[Extension of Embodiment]

Figure 16:
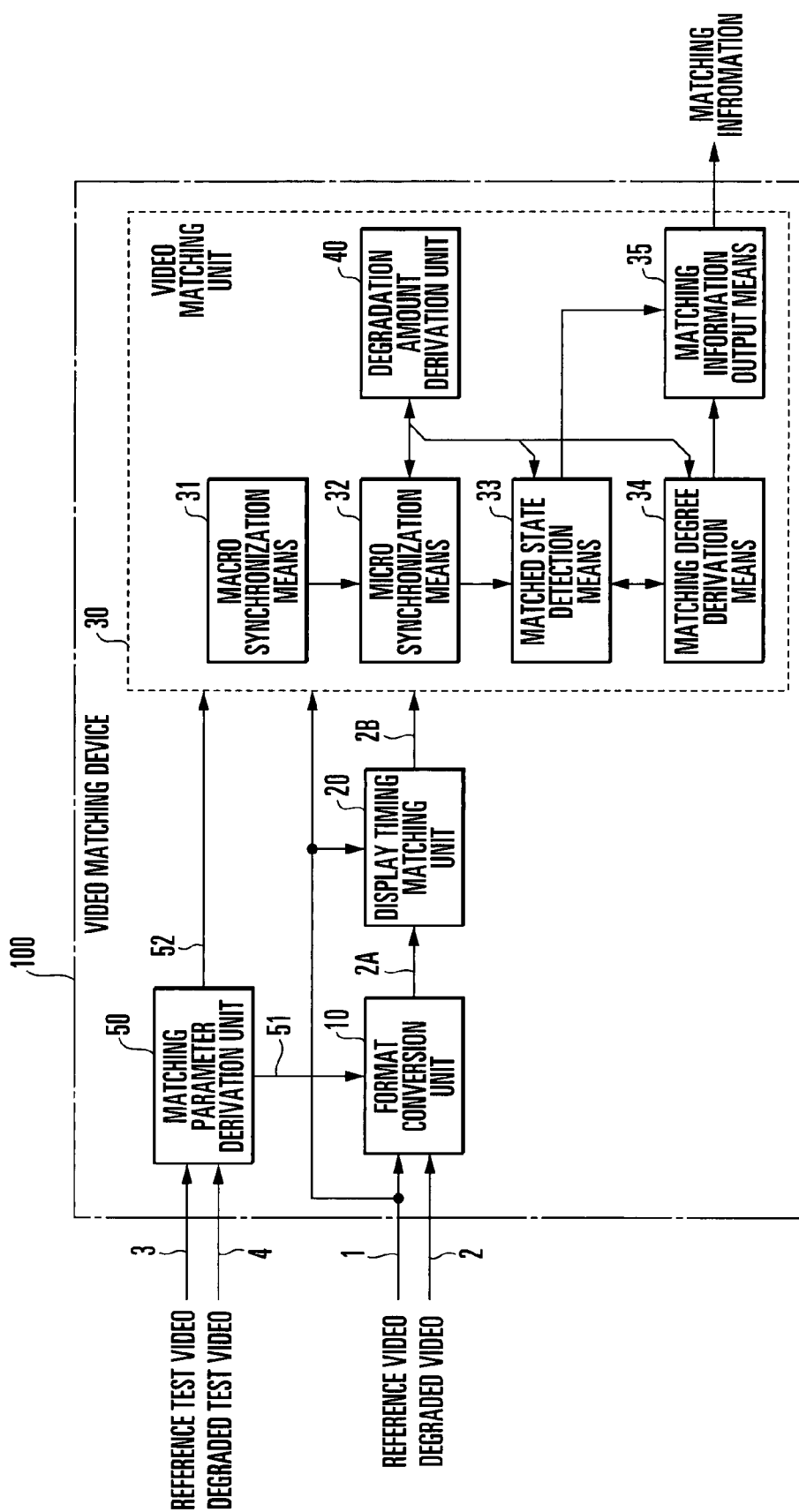
FIG. 16 is a block diagram showing the arrangement of a video matching device according to another embodiment of the present invention.

This embodiment has exemplified the case wherein the video matching unit 30 and the degradation amount derivation unit 40 are implemented by discrete functional units, as shown in FIG. 1. Each of these two functional units is implemented by a signal processing circuit unit and a computation processing unit. As shown in FIG. 16, the degradation amount derivation unit 40 and the video matching unit 30 may be implemented by the same functional units. This makes it possible to very easily exchange various kinds of data between each functional means of the video matching unit 30 and the degradation amount derivation unit 40, thus shortening the required processing time and reducing the hardware resources. This can equally apply to the relationship between the format conversion unit 10 and the display timing matching unit 20 and between the matching parameter derivation unit 50 and the video matching unit 30.

In addition, this embodiment has exemplified the case wherein in the micro synchronization processing in step 111, a fixed degraded video frame and a plurality of reference video frames form frame pairs. However, the present invention is not limited to this. For example, a fixed reference video frame, a corresponding degraded video frame, and a plurality of degraded video frames having temporal shifts within a predetermined number of frames from the degraded video frame may form frame pairs. This allows to execute micro synchronization processing in a similar manner as described above.

This embodiment has exemplified the case wherein the micro synchronization means 32 and the matched state detection means 33 are implemented by discrete functional means. However, the present invention is not limited to this. As described above, the micro synchronization means 32 and the matched state detection means 33 each have the function of controlling the degradation amount derivation unit 40 to acquire the degradation amounts of a plurality of frame pairs, and selecting a frame pair exhibiting the minimum degradation amount. It therefore suffices to implement these means by using the same functional means.

In this embodiment, when the matching information output means 35 is to output a video after matching, it suffices to output a reference video frame and a degraded video frame which are used for the calculation of a matching degree as a matched reference video and a matched degraded video, respectively.

In addition, this embodiment has exemplified the case wherein the externally input reference video 1 is used for video matching processing in the video matching unit 30. However, the present invention is not limited to this. For example, when the display timing matching unit 20 interpolates the frame rate of the reference video 1 as shown in FIG. 9, it suffices to perform video matching processing by using the interpolate reference video 1.

This embodiment has exemplified the case wherein the matching parameter derivation unit 50 is provided. However, it suffices to derive parameters required in the processing in FIG. 2 without providing the matching parameter derivation unit 50.

In the micro synchronization processing in step 111, for example, when a degradation amount is to be calculated between each frame pair comprising a degraded video frame of the degraded video 2B and each corresponding reference processing target frame of the reference video 1, it suffices to calculate several signal-to-noise ratios PSNR in advance by using the degradation amount derivation unit 40 while a pixel position in the spatial direction between each frame pair, i.e., a shift amount, is changed, and derive a shift amount in the spatial direction when the signal-to-noise ratio PSNR becomes maximum as the shift amount 5C in the spatial direction.

In addition, it suffices to derive the luminance occurrence range 5B, on the basis of a frame pair at the time when micro synchronization is established, from the maximum and minimum luminance values (including colors) of the reference video frame and the degraded video frame, and to drive the luminance or color occurrence distribution 5G (average values, variances, or the numbers of gray levels).

Furthermore, this embodiment includes the matching parameter derivation unit 50 to compare a predetermined test reference video with a test degraded video obtained from the test reference video by an assessment target and derive various kinds of matching parameters to be used to match the reference video with the degraded video. This makes it possible to derive matching parameters conspicuously representing the degradation characteristics of an assessment target as compared with the case wherein a general reference video and a general degraded video are used as described above. In addition, since matching processing is performed on the basis of such matching parameters, video matching can be properly performed even if a reference video or degraded video is blurred or an assessment target is greatly degraded.

The above video matching method is based on the assumption that a reference video, a matched video, and corresponding matching information (states in the temporal direction) output from the video matching unit 30 are input to the objective assessment device. If, however, the video matching unit 30 receives an objective assessment value from the degradation amount derivation unit 40 instead of a degradation amount in micro synchronization processing and outputs the result, the video matching device 100 can also be used as an objective assessment device.

INDUSTRIAL APPLICABILITY

When the quality of a video played back by a terminal on the receiving side is to be objectively assessed in quality management for a video distribution service or video communication service using an IP network such as the Internet, the video matching device according to the present invention is useful as a device which temporally and spatially matches a reference video with a degraded video.

The invention claimed is:
1. A video matching device comprising:
matched state detection means for receiving an arbitrary reference video having a plurality of reference video frames arranged along a time axis and a degraded video having degraded video frames obtained when the reference video frames are degraded by an arbitrary assessment target, and detecting, for said each degraded video frame, a reference video frame, of a plurality of reference video frames having temporal shifts within a predetermined number of frames from the degraded video frame, which is in a matched state in which the reference video frame is spatially and temporally matched with the degraded video frame;
matching degree derivation means for deriving a matching degree indicating a degree of matching between a reference video frame and a degraded video frame in the matched state;
matching information out cans for outputting a reference video, a degraded video, and the matching degree on the basis of the matched state;
a degradation amount derivation unit which derives a degradation amount indicating a degradation degree between two arbitrary video frames, wherein said matching degree derivation means controls said degradation amount derivation unit to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels and calculate the matching degree on the basis of a ratio between the first degradation amount and the second degradation amount,
micro synchronization means for selecting frame pairs having an arbitrary degraded video frame and a plurality of reference video frames having temporal shifts within a predetermined number of frames relative to the degraded video frame from a reference video and a degraded video which are macro-synchronized on the basis of the macro frame difference, acquires a degradation amount for each frame pair by controlling said degradation amount derivation unit, and derives a micro frame difference between the reference video and the degraded video on the basis of a frame pair, of the frame pairs, which exhibits a minimum degradation amount, wherein said matched state detection means receives a reference video and a degraded video which are temporally synchronized on the basis of the macro frame difference and the micro frame difference; and
macro synchronization means for deriving a macro frame difference between the reference video and the degraded video by comparing transitions of predetermined video feature amounts extracted from each reference video frame of the input reference video and each degraded video frame of the input degraded video, wherein said matched state detection means receives a reference video and a degraded video which are temporally synchronized on the basis of the macro frame difference.

2. A video matching device according to claim 1, wherein said degradation amount derivation unit calculates a signal-to-noise ratio between the reference video frame and the degraded video frame as the first degradation amount under the control of said matching degree derivation means.

3. A video matching device according to claim 1, wherein said degradation amount derivation unit calculates, as the second degradation amount under the control of said matching degree derivation means, an average signal-to-noise ratio between the reference video frame in the matched state and each video frame of the degraded video in a state shifted from the matched state by a predetermined number of pixels in a horizontal direction, a vertical direction, or vertical/horizontal directions.

4. A video matching device according to claim 1, wherein said matching degree derivation means calculates the matching degree by calculating, as a spatial feature amount of the reference video, a spatial information value that is a spatial feature amount provided under ITU-T P.910 and then multiplying the aforesaid ratio by the resultant spatial information value.

5. A video matching device according to claim 1, further comprising a format conversion unit which converts a signal format of the degraded video into a signal format of the reference video and outputs the reference video, and a display timing matching unit which matches and outputs the reference video and the degraded video after the format conversion upon matching the number of video frames included therein and display timings thereof, wherein said matched state detection means receives a reference video and a degraded video after display timings thereof are matched by said display timing matching unit.

6. A video matching device according to claim 5, further comprising a matching parameter derivation unit which compares a predetermined reference test video with a degraded test video obtained when the reference test video is degraded by the assessment target, and derives, as matching parameters, an enlargement/reduction ratio associated with sizes of a video frame of the reference test video and a video frame of the degraded test video and a luminance range used for the reference test video and the degraded test video, wherein said format conversion unit performs the format conversion on the basis of the enlargement/reduction ratio and the luminance range.

7. A video matching device according to claim 1, wherein said matched state detection means controls said degradation amount derivation unit to acquire a degradation amount for each frame pair comprising the degraded video frame and each reference video frame as a search target, and determines that a frame pair, of the frame pairs, which exhibits a minimum degradation amount is in a matched state.

8. A video matching device according to claim 7, wherein said degradation amount derivation unit calculates a signal-to-noise ratio between the reference video frame and the degraded video frame as the degradation amount in accordance with an instruction from said matched state detection means.

9. A video matching method comprising:
a matched state detection step causing a matched state detection means to receive an arbitrary reference video having a plurality of reference video frames arranged along a time axis and a degraded video having degraded video frames obtained when the reference video frames are degraded by an arbitrary assessment target, and detect, for each degraded video frame, a reference video frame, of a plurality of reference video frames having temporal shifts within a predetermined number of frames from the degraded video frame, which is in a matched state in which the reference video frame is spatially and temporally matched with the degraded video frame;
a matching degree derivation step causing a matched degree derivation means to derive a matching degree indicating a degree of matching between a reference video frame and a degraded video frame in the matched state;
a matching information output step causing a matching information output means to output a reference video, a degraded video, and the matching degree on the basis of the matched state; and
a degradation amount derivation step causing a degradation amount derivation unit to derive a degradation amount indicating a degradation degree between two arbitrary video frames, wherein the matching degree derivation step comprises the steps of using the degradation amount derivation step to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels, and calculating the matching degree on the basis of a ratio between the first degradation amount and the second degradation amount;
deriving a macro frame difference between the reference video and the degraded video by comparing transitions of predetermined video feature amounts extracted from each reference video frame of the input reference video and each degraded video frame of the input degraded video, wherein said matched state detection means receives a reference video and a degraded video which are temporally synchronized on the basis of the macro frame difference; and
selecting frame airs having an arbitrary degraded video frame and a plurality of reference video frames having temporal shifts within a predetermined number of frames relative to the degraded video frame from a reference video and a degraded video which are macro-synchronized on the basis of the macro frame difference, acquires a degradation amount for each frame pair by controlling said degradation amount derivation unit, and derives a micro frame difference between the reference video and the degraded video on the basis of a frame pair, of the frame pairs, which exhibits a minimum degradation amount, wherein said matched state detection means receives a reference video and a degraded video which are temporally synchronized on the basis of the macro frame difference and the micro frame difference.

10. A non-transitory computer-readable recording storage medium encoded with instructions which, when executed causes a computer of a video matching device which receives an arbitrary reference video having a plurality of reference video frames arranged along a time axis and a degraded video having degraded video frames obtained when the reference video frames are degraded by an assessment target, and outputs the reference video and the degraded video upon spatially and temporally matching the reference video and the degraded video to execute:
a matched state detection step causing a matched state detection means to receive an arbitrary reference video having a plurality of reference video frames arranged along a time axis and a degraded video having degraded video frames obtained when the reference video frames are degraded by an arbitrary assessment target, and detect, for each degraded video frame, a reference video frame, of a plurality of reference video frames having temporal shifts within a predetermined number of frames from the degraded video frame, which is in a matched state in which the reference video frame is spatially and temporally matched with the degraded video frame,
a matching degree derivation step causing a matched degree derivation means to derive a matching degree indicating a degree of matching between a reference video frame and a degraded video frame in the matched state,
a matching information output step causing a matching information output means to output a reference video, a degraded video, and the matching degree on the basis of the matched state;
a degradation amount derivation step causing a degradation amount derivation unit to derive a degradation amount indicating a degradation degree between two arbitrary video frames, wherein the computer is caused to execute, as the matching degree derivation step, the steps of using the degradation amount derivation step to acquire a first degradation amount indicating a degradation amount between a reference video frame and a degraded video frame in the matched state, and a second degradation amount indicating a degradation amount between a reference video frame and a degraded video frame which are in a state shifted from the matched state by a predetermined number of pixels, and calculating the matching degree on the basis of a ratio between the first degradation amount and the second degradation amount;

deriving a macro frame difference between the reference video and the degraded video by comparing transitions of predetermined video feature amounts extracted from each reference video frame of the input reference video and each degraded video frame of the input degraded video, wherein said matched state detection means receives a reference video and a degraded video which temporally synchronized on the basis of the macro frame difference; and selecting frame pairs having an arbitrary degraded video frame and a plurality of reference video frames having temporal shifts within a predetermined number of frames relative to the degraded video frame from a reference video and a degraded video which are macro-synchronized on the basis of the macro frame difference, acquires a degradation amount for each frame pair by controlling said degradation amount derivation unit, and derives a micro frame difference between the reference video and the degraded video on the basis of a frame pair, of the frame pairs, which exhibits a minimum degradation amount, wherein said matched state detection means receives a reference video and a degraded video which are temporally synchronized on the basis of the macro frame difference and the micro frame difference.

* * * * *

UNITED STATES PATENT AND TRADEMARK OFFICE
CERTIFICATE OF CORRECTION

| | | |
|---|---|---|
| PATENT NO. | : 8,094,196 B2 | Page 1 of 1 |
| APPLICATION NO. | : 11/921209 | |
| DATED | : January 10, 2012 | |
| INVENTOR(S) | : Jun Okamoto and Takaaki Kurita | |

It is certified that error appears in the above-identified patent and that said Letters Patent is hereby corrected as shown below:

Column 16, Claim 1, line 1, please delete "out cans" and insert -- output means --.

Column 18, Claim 9, line 13, please delete "airs" and insert -- pairs --.

Signed and Sealed this

Thirteenth Day of November, 2012

David J. Kappos
*Director of the United States Patent and Trademark Office*